Oct. 13, 1964  R. W. STOERTZ ETAL  3,152,985
UTILIZATION OF BARK FLY ASH AND LIKE MATERIALS
Filed Sept. 19, 1960
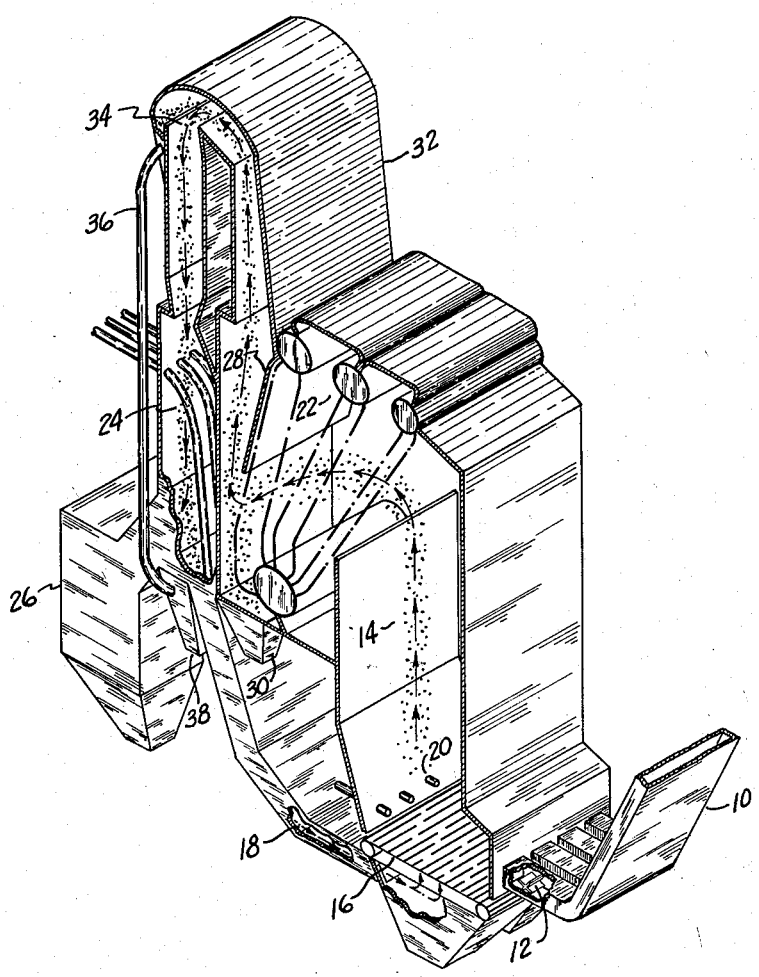
INVENTOR.
R.W. STOERTZ & W.B. GOODWIN
BY John H. Roberts
Agent

United States Patent Office 3,152,985
Patented Oct. 13, 1964

3,152,985
UTILIZATION OF BARK FLY ASH AND LIKE MATERIALS
Robert W. Stoertz, Moreland, Charleston, and William B. Goodwin, Berkeley Hills, North Charleston, S.C., assignors to West Virginia Pulp and Paper Company
Filed Sept. 19, 1960, Ser. No. 56,816
6 Claims. (Cl. 210—40)

This invention relates to the utilization of fly ash from the burning of bark and pine wood wastes.

Large quantities of bark are obtained each year as a waste material from the wood processing industries. In the major wood processing industries, and particularly in the paper industry, the bark cannot be utilized with the wood and the bark must somehow be disposed of. Although many proposals have been made for different uses of this bark, usually it is burned, not only to dispose of it, but also to realize some slight value from the bark. Bark, however, is a relatively poor fuel due to its high moisture content which generally ranges between approximately 40 and 60 percent. Nevertheless, it is burned in large furnaces and the heat produced generally is employed to produce steam. Large quantities of fly ash are produced by the burning of the bark which in turn presents somewhat of a problem. If permitted to be carried into the atmosphere with the flue gases, it greatly aggravates the air pollution problems which already are of a serious nature around any paper mill. Consequently, the fly ash is removed from the flue gases by devices, such as Bubar collectors, and fed back to the furnace where it is burned. The value of this fly ash as a fuel is approximately equivalent to soft coal on a heat value basis, or about $12.00 to $15.00 per ton. Burning of the bark fly ash in the paper industry has been customary for many years.

We have now found, however, that fly ash produced by the burning of bark under certain conditions is a highly activated carbon possessing very great adsorptive characteristics toward certain types of compounds which impart undesirable tastes and odors to liquids, such as water. Bark fly ash, in fact, when prepared under proper conditions, is comparable to commercial water grade active carbons, and can be employed in the many applications for which the water grades of carbon are commonly employed without and further treatment except for grinding to produce particles of a size desired for application.

It is very surprising that the bark fly ash should possess these highly adsorptive characteristics. It has long been known through the disclosures of Ruder, U.S. Patent 1,784,543, and Geis, U.S. Patent 1,902,068, that fly ash from the burning of various other solid fuels can be processed to obtain a fraction which possesses a "high" degree of activity. The yield of the fraction possessing "high" activity, however, was very small, less than 35 percent, as indicated by Geis, and the activity of the "highly" active fraction was very low compared to other carbons available which were produced by other methods. As a result, fly ash for use as an active carbon has never been commercially produced or marketed to our knowledge.

The bark fly ash is a "water" or "deodorizing" grade of carbon as distinguished from a "decolorizing" grade of carbon. The water grades have a high adsorptive capacity for compounds commonly causing taste and odor and consequently are widely employed in the treatment of municipal water supplies to make the water more palatable. Two tests are generally employed in determining the adsorptive capacity of carbons which are used for water treatment and in like uses. These are the Phenol Test and Iodine Test. The Phenol Test has been established by the American Water Works Association as a standard for testing water grade carbon. This organization specifies that a carbon to be classified as a "water" grade carbon must have a phenol value of less than 30. The iodine test is a very easily run test which is widely employed throughout the active carbon industry and in general correlates with the phenol test. For details of these tests, see pages 345–347 of Active Carbon by J. W. Hassler, copyright 1951, Chemical Publishing Co., Inc., Brooklyn, New York.

Generally carbons having an iodine value of 75 or more will have a phenol value of less than 30 and be acceptable in the treatment of water. Bark fly ash will range in iodine value between 75 and 95 and in phenol value between 15 and 25. This is well within the specifications established by the American Water Works Association.

In comparison, fly ash obtained from the burning of other solid fuels does not possess these high adsorptive characteristics. Coal fly ash has been obtained from several different furnaces. These fly ashes were screened to remove particles larger than 20 mesh and tested for adsorptivity of both iodine and phenol. The results of these tests were exceedingly poor and indicated that by today's standard, coal fly ash cannot be classified as an active carbon. The iodine value of the coal fly ash ranged between 10 and 20 while the phenol value was infinite as the adsorption of phenol was immeasurable.

Fly ash from the burning of bagasse which is very similar in chemical and physical characteristics to bark has also been obtained and tested. The iodine value for the bagasse fly ash, while considerably higher than that of coal fly ash, was only 50.

To test fly ash from other materials, it was necessary to devise a method to obtain a char which would compare with fly ash. The method which was developed was to place a given amount of pulverized solid fuel in a stainless steel wire basket and place the basket in a furnace about 1 or 2 feet above the burning bed of bark for a given period of time. When this method was employed with bark, the adsorptive characteristics of the char obtained in the basket correlated quite well with the adsorption characteristics of the fly ash being obtained from the furnace. By employing this method, other solid fuels were tested. Although some fuels, notably wood and peat, yielded chars which were vastly superior to coal fly ash, none of the fuels, with one exception which will be described hereinbelow, yielded a char with the high adsorptive properties of bark at the same yields. Peat yielded chars of the highest activity during these tests. When peat having a moisture content of approximately 60% was burned at a temperature of about 1620° F. for two minutes a char having an iodine value of 67.9 was obtained at a yield of about 20%. Increasing the burning time to four minutes resulted in a char having an iodine value of 66.7 at about the same yield. Burning of dry peat for two minutes at 1620° F. resulted in a char having an iodine value of 76.0, however, the yield was only 6.2%. Burning of the dry peat for four minutes completely consumed the peat. Wood, which is very close to bark in both origin and chemical and physical structure, also yielded chars of relatively high iodine value. Pine chips when burned in a furnace for 3 minutes at approximately 1620° F. yielded a char with an iodine value of 63.5. The yield of this char was 8.2 percent of the original dry wood weight. Aspen flakes when burned for 2 minutes yielded a char with an iodine value of only 57 with a yield of 7.4 percent. In burning lignite the maximum iodine value which could be obtained in the char was 45.3. This was achieved by a 6 minute residence time at about 1600° F. The yield of this char was about 20.0 percent. For comparative purposes mixed pine and hardwood bark was also burned in the manner set forth. Burning of this mixed bark having a moisture content of approximately 22.3 percent at a temperature of 1600° F. for two minutes yielded a char with an iodine value of 75 at a yield of 21.4 percent. For three minutes burning the iodine value of the char increased to 86.2 while the yield dropped to 12.9 percent. Increasing the burning time to four minutes resulted in a char with an iodine value of 83.7 at a yield at 11.8 percent.

"Pine wood waste" gave chars having equal or even greater adsorptivity than mixed bark chars. For example, when a sample of pine wood waste was burned for 4 minutes in a furnace at approximately 1620° F., a char was obtained having an iodine value of 80 at a yield of 11 percent. The pine wood waste consisted of the bark, cones, needles and some wood from small branches of pine trees. As used herein the term "pine wood waste" is intended to include a mixture of solid fuel materials derived from the pine tree containing 70 percent or more of a mixture of pine bark, pine cones, and pine needles. It has been found that it is unimportant what the relative ratio of bark, cones and needles is so long as the total amount of the bark, pine cones, and pine needles taken together constitute over 70 percent of the total fuel.

As mentioned hereinabove peat with the exception of bark and pine wood waste has been found to yield chars of the greatest activity. It will be seen, however, by comparison of the iodine value and yields of the peat chars with those obtained from bark and pine wood waste that there is a substantial difference between the chars of these materials. As will be observed from the data shown hereinabove that at approximately the same adsorptivity, i.e., 75 for mixed bark char and 76 for peat char, the bark char was obtained in a yield of over three times that of the peat. Alternately, at approximately the same yield, i.e., 21 percent for mixed bark char and 20 percent for peat char, the iodine value of the bark char was about 7 units higher. While this difference in adsorptivity may appear to be very small it should be kept in mind that the iodine value is not a linear function of the adsorptive efficiency of a carbon. As a result of this non-lineal relationship carbons having relatively small differences in their iodine value may have large differences in their adsorptive efficiencies. For example, the peat char having an iodine value of 67.9 and a phenol value of 30.4 and a sorptivity index of 65.7. The mixed bark char having an iodine value of 75 had a phenol value of 20.3 and a sorptivity index of 98.5. The ratio of sorptivity index indicates that the bark char is about one and a half times as efficient as the peat char. In other words, about one and a half times as much peat char as bark char would be required to accomplish the same result. The bark char at 75 iodine value was also more efficient than that of the peat char at 76 iodine value. This peat char had a phenol value of 25.6 and a sorptivity index of only 78.3. In this case the bark char was about 25 percent more efficient than the peat char. It also should be kept in mind that the iodine values for the chars indicated hereinabove are the maximum we have been able to attain while bark chars having iodine values up to above 95 and sorptivity indexes up to about 150 have been produced. The great differences between the adsorptivity of the different chars as shown above, clearly indicate that bark, particularly pine bark, and pine wood waste are apparently unique among the solid fuels in their ability to produce chars of high activity at relatively high yields under the conditions of this invention.

Bark fly ash also possesses several other characteristics which distinguish it from the fly ashes of other solid fuels and particularly the fly ashes of coals. First, the bark fly ash is of a very large size compared to the fly ash from coal, for example. About 50 percent of the bark fly ash will be retained on a 10 mesh screen, about 70 percent on a 20 mesh screen, and about 85 percent on a 40 mesh screen. On the other hand, nearly all the coal fly ash will pass through a 10 mesh screen, about 80 percent or more will pass through a 20 mesh screen and a major portion of the coal fly ash will even pass through a 40 mesh screen. Secondly, bark fly ash has a very low ash content. Generally this ash content will range between only about 1 and 5 percent although it may in some cases be considerably higher, e.g., about 10 to 15 percent. This may be compared to coal fly ash which generally has an ash content of over 50 percent and which may run as high as 90 to 95 percent.

The bark fly ash also is active in its entirety and has very little difference in ash or activity between separate particle size fractions. The following table shows a typical analysis of a bark fly ash sample illustrating this fact. The combined sample before screening had an ash content of 3.1 percent and an iodine value of 84.2 percent.

| Mesh Size | Percent | Ash, Percent | Iodine Value |
| --- | --- | --- | --- |
| +10 | 60.0 | 3.0 | 79.8 |
| −10 +20 | 28.6 | 3.4 | 83.0 |
| −20 +40 | 5.7 |  | 84.2 |
| −40 | 5.7 |  | 82.4 |

The process of producing the fly ash from bark can best be understood by referring to the drawing which is a projection taken partially in section of a bark boiler of a type utilized throughout the paper industry. In this drawing, bark is fed from an overhead storage area, not shown, through a series of chutes 10 to a feeder mechanism 12. The feeder mechanism 12 throws the bark into the zone of combustion 14 of the furnace and distributes the bark over the surface of the rotary grate 16 where a burning bed of the bark is maintained. Forced air is supplied to the furnace through vent 18, which feeds a portion of the air through the rotary grate 16, and vents 20 which feeds the remaining air above the burning bed of bark on the grate 16. The combustion of the bark with the air creates a gas stream which rises out of the zone of combustion 14 and travels through the tube area 22, the air preheater section 24, the Bubar collector 26, and thence to the smoke stack, not shown. The gas stream carries with it quantities of charred bark along with sand and other inorganic materials which are contained in the bark when fed to the furnace.

As the gases flow through the tube area 22, they make a turn of about 180° around the baffle 28. As the gases make this turn, a portion of the fly ash, about 25 to 40 percent, falls out of the gas stream into collection bin 30. The gases containing the remaining fly ash flow through chamber 32 and again makes another 180° turn. The centrifugal force carries most of the remaining fly ash over the skimmer baffle 34 where it falls down tubes 36 to a collection bin 30. The gases next pass through the Bubar collector 26, where the sand and remaining fly ash are collected, before the gases pass to the stack. The fly ash can be removed from the bins 30, 38 and Bubar collector 26, ground to the desired size, and is ready for use.

A typical method of operating a Babcock and Wilcox bark boiler of the type shown in the drawing to produce the highly activated bark fly ash carbon is illustrated in the following example.

EXAMPLE

Pine bark is fed to the furnace at a rate of 24,000 pounds per hour. This bark was obtained directly from the log debarkers and contained approximately 40 percent moisture; the feed rate of bark being only about 14,500 pounds per hour or 174 tons per day. The bark particles varied widely in size, the largest particle being slabs 6 to 8 inches long by 3 to 4 inches wide by about ½ inch thick and the smallest particles consisting of pieces which would easily pass through a 325 mesh screen, being almost dust-like in character. Air was supplied to the furnace through vents 18 and 20 at a rate of about 175,000 pounds per hour. This amounts to above 45 percent excess air.

The air entering the furnace was divided between undergrate and overgrate air in a ratio of about 80:20. All the undergrate air had been heated to about 450° F. in the air preheater 24 prior to being supplied to the furnace. Under these conditions of bark feed and air supply, a temperature of about 1600° F. was maintained in the zone of combustion 14 and 82,000 pounds of steam were produced per hour. The fly ash was recovered at a rate of 5.8 tons per day from collector bins 30 and 38. This amounted to a yield of about 3.4 percent of the original dry weight of the bark. This fly ash had an iodine value of 86 and a phenol value of 17.5.

The operation of the boiler is not critical except that the temperature in the zone of combustion must be maintained at a temperature above about 1500° F. in order to obtain carbon of good quality. It is desirable that higher temperatures, above 1600° F., be employed. In general, the higher the temperature, the higher the quality of the carbon. However, after a temperature of about 2000° F. is reached, yields of the fly ash begin to decrease and problems are encountered with the ability of furnace construction materials to withstand the heat for extended periods.

While as shown in application Serial Number 765,314 filed October 6, 1958, now abandoned, of which this application is a continuation-in-part, it was thought necessary to operate the furnace in a manner such that the bark was initially burned to a char in an atmosphere lacking sufficient oxygen for complete combustion of the bark, it has now been found that such conditions are not necessary nor desirable and that, due to the manner in which bark burns, as will be explained hereinafter, a high carbon content char is formed even when a great excess of air is present during burning. Where a temperature of over 1500° F. is maintained within the furnace, bark, regardless of the method in which it is burned, forms a highly activated char. The activity and also yields of the fly ash produced by burning in excess air have now been found to be higher than that obtained by limiting the oxygen in the zone of combustion. As increased boiler efficiency can also be obtained by employing excess air in the burning bed of bark, this method is much preferred over the method wherein the oxygen during the initial burning stage is limited to that which is insufficient for complete combustion. Both methods, however, may be employed to produce active fly ash, as long as the temperature in the furnace is maintained at at least 1500° F.

Generally in order to maintain efficient boiler operation and to provide the necessary temperature within the furnace for activation, air in excess to the stoichiometric amount necessary for burning the bark will be required. About 10 to 50 percent total excess air has been found to be satisfactory. Using excess air within this range the gas flow through the furnace should be sufficient for carrying the charred bark particles while being insufficient for carrying the uncharred bark.

The gas stream normally acts much like an air classifier. As the bark burns, the volatile materials contained in the bark are first driven off and burned, leaving a carbon residue. This carbon residue or char, having had a large portion of its original weight removed, is of a much lower density than the original bark and consequently capable of being carried by the gas stream at a much lower velocity than is required to carry particles of bark. While the apparent density of undried bark is about 30 pounds per cubic foot, and dry bark about 18 pounds per cubic foot, the density of bark fly ash is only about 7.5 pounds per cubic foot. Thus, the gas stream velocity necessary to carry particles of given size of char is about one-half the velocity necessary to carry particles of uncharred dry bark of the same size, and only about one-quarter the velocity to carry uncharred wet bark particles. With the normal range of gas mass flow rates obtained in conventional bark burners of 600 to 1400 pounds per hour per square foot of furnace cross-section, the char will be carried from the zone of combustion, while the uncharred bark will not. If particles of uncharred bark are small enough to be carried by the gas stream, they will also be small enough to be charred by the time the particles leave the zone of combustion. Therefore, unless excessively high gas stream velocities are created, there will be no problem in separating raw bark from the char.

It is desirable from the standpoint of obtaining fly ash of high activity to heat the air prior to its entrance into the zone of combustion. Although heating of the air to a temperature of only 200° F. has been found to be helpful in increasing the iodine value of the fly ash, heating to even higher temperatures is desirable as the higher the temperature the higher the iodine value of the fly ash will be. An increase in the iodine value of the fly ash of as much as 10 percent can be achieved by feeding air to the furnace at 450° F. rather than at ambient temperatures. The mechanism by which heating of the air affects the iodine value of the fly ash is not understood, however, it has been found that the heating of the air should be done by means of a heat exchanger such as the air preheater 24 rather than by direct fired methods such as by burning gas or oil in the air. Combustion products from the burning of other fuels have a detrimental effect on the quality of the bark fly ash even when an excess of air is available for burning the bark.

Although bark from many varieties of trees has been burned and found to produce fly ash of satisfactory activity, there is a marked difference in the degree of activation which can be obtained employing different barks. Hardwood barks, in general, yield fly ash which is of greatly lower adsorptive capacity than can be obtained utilizing pine wood barks and similar coniferous wood barks. The difference in the iodine value of hardwood and pine bark fly ash obtained under identical conditions may be as much as 10 to 20 units. The reason for this difference between barks is not fully understood, but is believed to be primarily due to the more porous structure of pine bark which should provide a larger surface for contact with the activating gases in the gas stream. For the purposes of employing fly ash as an active carbon according to the present invention, the fly ash obtained from the burning of hardwood barks alone are of minimal value. The burning of these hardwood barks in conjunction with pine barks, however, appears to increase the activity of the hardwood bark fly ash and the use of hardwood barks in this manner is recommended.

The moisture content of the bark fed to the furnace has a very surprising effect on the yield. It is surprising in that the drier the bark the greater the yield of fly ash which can be obtained. Yield as indicated herein is the weight of the fly ash divided by the dry weight of the bark. Dry bark during burning, even in an excess of oxygen, rapidly loses weight until a point is reached where about 20 percent of the original dry weight remains. Continued burning reduces the weight very slowly; at a rate about $\frac{1}{60}$ of the rate of weight loss during the initial burning period. Wet bark of about 40 percent moisture burns in a similar manner, however, it is not until the bark reaches a much lower weight, about 13 or 14 percent of the original dry weight of the wet bark, that the weight loss decreases so markedly. This phenomena cannot be fully explained, but is believed to be due to the steam produced in the wet bark causing destructive distillation of organic compounds which in dry bark would be charred leaving a carbon residue. Between the extremes of very wet bark and oven dry bark, there is a gradual increase in yields obtained as the moisture content of the bark is decreased. In general, it is preferred, due to the increased yield in fly ash and greater efficiency obtained in the furnace, that the bark being burned contain about 10 percent or less moisture. Most preferably, the bark should be oven dry, i.e., essentially 0 percent moisture, however, from a practical standpoint it does not appear to be economically feasible to accomplish this. Drying of the bark can be easily accomplished by employing waste flue gases in the manner shown in U.S. Patent 2,271,157.

The fact that bark and also pine wood waste burns in the manner described above may account for their unique ability to be highly uniformly activated. Coal, for example, when burned in air, is consumed more or less on the surface and little if any volatilization of the decomposable materials in the interior of the particle occurs prior to the time the carbon on the surface of the particle is consumed. Consequently, most of the coal is actually consumed before a uniform char is obtained.

It is possible to obtain increased yields by reducing the bark to a uniform particle size in the range of ⅛ to ½ inch in diameter, i.e., those that will pass through a ½ inch stone screen and be retained on a ⅛ inch stone screen. Normally, bark is obtained in a wide range of particle sizes from large chunks of 6 to 8 inches long to minute particles which are almost like dust. The large chunks, even when burned or charred, are still of too great a weight to be practically carried from the furnace by the gas stream. Consequently, the charred chunks remain in the furnace and are slowly consumed until a particle size is reached which will be carried by the gas stream. This, of course, results in considerable loss of carbon. By reducing the bark to the small particle size before feeding it to the furnace, the bark will, as soon as it is charred, be of small enough size to be immediately carried from the zone of combustion by the gas stream and little if any of the carbon residue will be consumed.

Another method which has been found to increase the yield of the fly ash active carbon is to maintain the burning bed of bark on the grate in a constant state of agitation. This may easily be accomplished by employing jets of air impinging on the bed or by mechanical means. The effect of this agitation is not known for certain but it appears that small particles which otherwise may be covered up by fresh bark being fed to the furnace and prevented from being carried into the flue are freed from the overlying bark. They, thus, are able to be picked up by the gas stream and carried from the zone of combustion.

In order to achieve optimum results, the preferred features specified hereinabove should be combined. That is to say, that the preferred overall method of practicing the present invention is to employ dry pine bark which has been puverized to yield particles having a diameter between ⅛ and ½ inch as the role fuel. These dry particles of bark are burned in the presence of excess air which has been indirectly heated to a temperature above 200° F. prior to its entrance into the area of combustion. The rate of burning of the bark is maintained at such a level that the temperature in the furnace is above about 1600° C. Under these conditions, fly ash having the greatest activity will be obtained at the highest yields.

Samples of the bark fly ash were tested in the treatment of municipal water supplies in fifteen different locations. The two samples of fly ash employed had iodine values of 91.6 and 80 and phenol values of 15.5 and 20 respectively. The fly ash was prepared for use in adding it to the water by grinding it until 90–95 percent of it passed through a 325 mesh screen. The results of the tests indicate that the bark fly ash is comparable with commercial water carbons. During these tests, it was found that bark fly ash has several desirable characteristics not possessed by the commercial carbons. Compared to the commercial carbons, the bark fly ash is freer flowing and causes less difficulties with feed equipment. It wets faster and more completely, is less dusty, and being more dense, settles out of water somewhat more quickly. The packed density of ground bark fly ash ranges between 24 and 30 pounds per cubic foot compared to packed densities of about 18 to 20 pounds per cubic foot for most commercial water grade carbons.

The following table presents the results of the use of bark fly ash in these tests. In this table sample #1 refers to bark fly ash sample having the iodine value of 91.6 and phenol value of 15.5 and sample #2 refers to a bark fly ash sample having an iodine value of 80 and phenol value of 20.

For comparative purposes, two commercial water grade carbons were also used in these tests. These carbons are shown in the following table as samples A and B. These commercial carbons are prepared by the activation of charred waste liquor and are sold by the West Virgina Pulp and Paper Company under the trademark "Nuchar." Sample A had an iodine value of 94.5 and a phenol value of 19.5 while sample B had an iodine value of 78.6 and a phenol value of 26.0.

*Table I*

| Type Odor | Threshold Odor No. of Raw Water | Carbon Applied | | Threshold Odor No. after Carbon Addition | Percent Odor Removed |
|---|---|---|---|---|---|
| | | Type | Amount, p.p.m. | | |
| Musty Grassy | 10 | A | 10 | 3.2 | 69 |
| | | B | 10 | 4.5 | 55 |
| | | 1 | 10 | 4.5 | 55 |
| | | 2 | 10 | 7 | 30 |
| Grassy | 27 | A | 10 | 7 | 76 |
| | | B | 10 | 11 | 60 |
| | | 1 | 10 | 7 | 73 |
| | | 2 | 10 | 11 | 60 |
| Musty Rotten | 70 | A | 50 | 7 | 90 |
| | | B | 50 | 10 | 85 |
| | | 1 | 50 | 8 | 89 |
| | | 2 | 50 | 13 | 81 |
| Musty | 18 | A | 20 | 3.5 | 80 |
| | | B | 20 | 5 | 72 |
| | | 1 | 20 | 4.5 | 75 |
| | | 2 | 20 | 5 | 72 |
| Musty Moldy | 15 | A | 20 | 3 | 80 |
| | | B | 20 | 5 | 67 |
| | | 1 | 20 | 3.5 | 77 |
| | | 2 | 20 | 4.5 | 70 |
| Fishy-Septic | 30 | A | 10 | 18 | 40 |
| | | B | 10 | 22 | 27 |
| | | 1 | 10 | 18 | 40 |
| | | 2 | 10 | 18 | 40 |
| Hydrocarbon | 12 | A | 10 | 6 | 50 |
| | | B | 10 | 8 | 33 |
| | | 1 | 10 | 6 | 50 |
| | | 2 | 10 | 8 | 33 |
| Kerosene-Oil Refinery | 40 | A | 40 | 7 | 82.5 |
| | | B | 40 | 11 | 72 |
| | | 1 | 40 | 9 | 77.5 |
| | | 2 | 40 | 12 | 70 |
| Do | 40 | A | 40 | 7.5 | 81 |
| | | B | 40 | 12 | 70 |
| | | 1 | 40 | 8.5 | 79 |
| | | 2 | 40 | 13 | 67 |
| Musty-Chemical Oil Refinery | 14 | A | 20 | 6.5 | 54 |
| | | B | 20 | 9 | 36 |
| | | 1 | 20 | 7.5 | 46 |
| | | 2 | 20 | 10 | 29 |
| Chemical Styrene | 122 | A | 100 | 15 | 89 |
| | | B | 100 | 16.5 | 85 |
| | | 1 | 100 | 18 | 85 |
| | | 2 | 100 | 20 | 83 |
| Musty-Chemical Oil Refinery | 30 | A | 20 | 9 | 70 |
| | | B | 20 | 11 | 63 |
| | | 1 | 20 | 8 | 73 |
| | | 2 | 20 | 11 | 63 |
| Do | 10 | A | 10 | 3.0 | 70 |
| | | B | 10 | 3.5 | 65 |
| | | 1 | 10 | 3.0 | 70 |
| | | 2 | 10 | 4.0 | 60 |
| Musty-Moldy Yeast | 6.5 | A | 15 | 3 | 54 |
| | | B | 15 | 4 | 38 |
| | | 1 | 15 | 3.2 | 50 |
| | | 2 | 15 | 4.5 | 31 |
| Musty-Vegetable | 12.5 | A | 20 | 2.2 | 82 |
| | | B | 20 | 4.5 | 64 |
| | | 1 | 20 | 2.7 | 78 |
| | | 2 | 20 | 4.7 | 62 |

From the above, it is readily seen that the bark fly ash is a highly effective material for removing taste and odor causing materials from liquids.

Bark fly ash active carbon is somewhat unusual among commercially prepared active carbons in that it is produced in an extremely short period of time, i.e., in about 1 to 5 minutes. As a consequence of this rapid activation the carbon contains a very high percentage of its surface area in the form of micropores of 20 angstroms or less in diameter. These micropores are particularly effective in adsorbing the relatively small molecules of phenolic compounds which commonly cause taste and odor. The percentage of surface area in pores of 20 angstroms or less has been found to be above 90 percent. This may be compared to other commercial water grade active carbons which generally have about 50 percent or less of the surface area in pores of 20 angstroms or less.

While bark fly ash is a water or deodorizing grade of active carbon, it is well suited for further activation to a higher valued decolorizing grade of carbon. This further activation may be accomplished by many of the standard activation procedures employed in preparing decolorizing carbons. Molasses value of the carbon can particularly be developed by high temperature activation with steam, air or carbon dioxide, by low temperature activation with air or by a combination of these methods. For example, five samples of bark fly ash having an iodine value of 80.0 and a molasses value of 50 were placed in a tube and heated to 800–830° C. During the heating, steam sufficient to maintain the fly ash in a state of agitation was passed through the tube. The heating of the five samples was conducted for varying lengths of time to obtain varying yields. The following table shows the effect of this high temperature steam activation on the molasses value, iodine value, and dye adsorptivity of the fly ash. The values cited for dye adsorption are relative efficiencies compared to a sample of a commercial decolorizing grade of carbon which was assigned an efficiency of 1.00. This commercial carbon had a molasses value of 168 and an iodine value of 96. The carbons were all evaluated at a 90 percent color removal of the dye solutions.

Table II

| Recovery, Percent | Molasses Value | Iodine Value | Aniline Blue | Chrysoi- dine R | Ponceau R |
| --- | --- | --- | --- | --- | --- |
| No treatment | 50 | 80 | 0.22 | 0.08 | 0.14 |
| 80 | 69 | 98.1 | 0.46 | 0.86 | 0.38 |
| 72.5 | 85 | 98.9 | 0.52 | 1.07 | 0.38 |
| 50 | 180 | 99.1 | 0.93 | 1.94 | 0.87 |
| 40 | 335 | 99.2 | 1.32 | 1.70 | 1.51 |
| 37.5 | 435 | 99.1 | 1.54 | 2.35 | 2.12 |

When a sample of bark fly ash having an iodine value of 80.0 and a molasses value of 51 was subjected to a high temperature activation with air at 1560° F. a molasses value of 132 was developed at a yield of 22.5 percent. The iodine value increased to 98.6 during this activation. A two step activation of this same fly ash in which the fly ash was first subjected to steam at 1530° F. to obtain a carbon of 92 molasses value and 99.3 iodine value and then followed by a low temperature activation with air at 900–1000° F. produced a carbon of 133 molasses value. The overall yield of this activation was 40 percent.

In general, molasses value can be developed by passing steam, air, or carbon dioxide through the fly ash at temperatures in the range of 1400–1800° F., by heating in the presence of air at a low temperature between about 900–1000° F., or by a combination of these processes.

It is possible, although not desirable to obtain active carbon fly ash by burning a mixture of bark and some other solid fuel such as coal. The bark fly ash obtained by the joint burning of fuels is a lower quality than bark fly ash obtained by burning bark alone. Apparently the combustion products from the burning of the second fuel contaminates the bark fly ash to some extent. Another problem which develops is that the bark fly ash must be separated from the fly ash of the other fuel. A large portion of the bark fly ash can be obtained by screening as the bark fly ash is of a much larger size. However, as some of the bark fly ash and coal fly ash is of the same particle size, some bark fly ash is either lost with resultant decreased yields or coal fly ash is retained and dilutes the apparent activity of the bark fly ash.

We claim:

1. The method of removing color bodies from a fluid which comprises contacting the fluid with particles of fly ash obtained from the burning of a material selected from the group consisting of bark, pine cones, pine needles and mixtures thereof with air at a temperature above 1500° F., said particles of fly ash having been subjected to the action of an activating gas selected from the group consisting of air at 900–1000° F., steam at 1400–1800° F., carbon dioxide at 1400–1800° F., and mixtures of steam, air, and carbon dioxide at 1400–1800° F.

2. The method of removing taste and odor causing bodies from a fluid which comprises contacting the fluid with particles of fly ash obtained from the burning of a material selected from the group consisting of bark, pine cones, pine needles and mixtures thereof with air at a temperature above 1500° F.

3. The method of claim 2 wherein the fly ash is from the burning of pine bark.

4. The method of claim 2 wherein at least about 90% of the fly ash particles are small enough to pass through a 325 mesh screen.

5. The method of removing taste and odor causing materials from a liquid which comprises contacting the liquid with particles of fly ash obtained from the burning of bark with air at a temperature above 1600° F., said particles of fly ash being in a finely divided state wherein at least 90% will pass through a 325 mesh screen and having an iodine value of at least 75 and a phenol value less than 30.

6. The method of treating water to remove taste and odor causing materials therefrom which comprises contacting said water with particles of fly ash obtained from the burning of bark with air at a temperature above 1500° F., said particles of fly ash having a phenol value of less than 30 and being employed at a dosage level of from about 10 to 100 parts per million parts of water.

References Cited in the file of this patent

UNITED STATES PATENTS

| 1,641,053 | Sauer | Aug. 30, 1927 |
| 2,632,738 | Hassler et al. | Mar. 24, 1953 |

OTHER REFERENCES

Hassler: Active Carbon, Chem., Publ. Co., 1951, page 13.

Mantell: Industrial Carbon, 2nd Ed., Van Nostrand, 1946, page 116.